July 7, 1942.  W. L. REMICK  2,288,744
PROCESS OF AND APPARATUS FOR SEPARATING MIXED MATERIALS
Filed Jan. 7, 1939
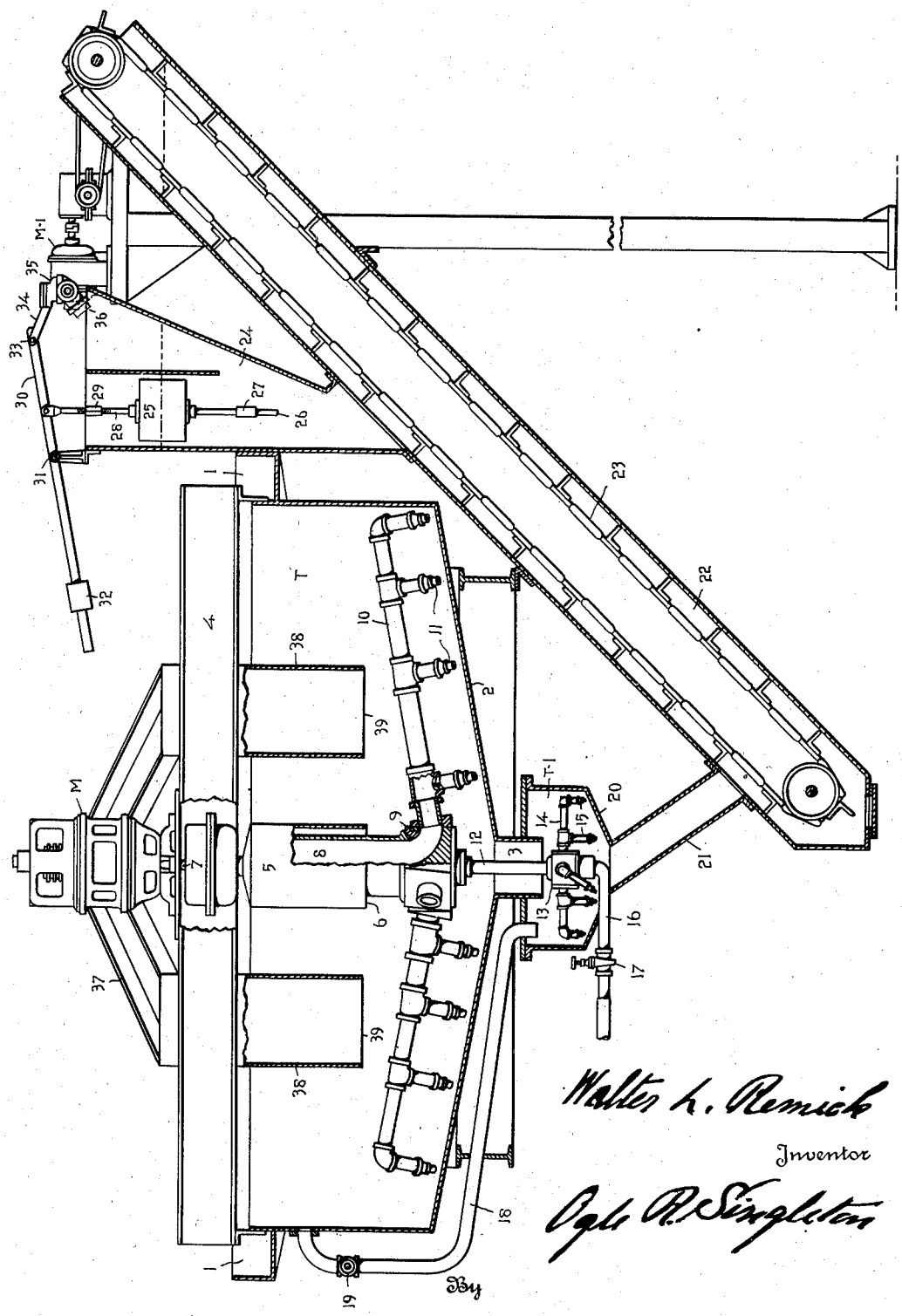
Walter L. Remick
Inventor
By Ogle R. Singleton
Attorney Patented July 7, 1942

2,288,744

UNITED STATES PATENT OFFICE 2,288,744

PROCESS OF AND APPARATUS FOR SEPARATING MIXED MATERIALS

Walter L. Remick, Hazleton, Pa.

Application January 7, 1939, Serial No. 249,817

6 Claims. (Cl. 209—159)

My invention consists in a new and useful improvement in process of and apparatus for separating mixed materials, and is designed for separating materials of different specific gravities. My improved process comprises the segregation of overflow and underflow products by hydraulic separation, in each of three stages of the process. The first stage is accomplished by circulation of a fluid medium, the second by an extraneous regulated current of a fluid medium, and the third by a second extraneous current of a fluid medium automatically controlled by fluctuations in density of the circulated fluid medium. The particularly novel and useful features of my process are the three stages of hydraulic separation and the automatic control of the operation of the third stage.

While I have illustrated in the drawing filed herewith and have hereinafter fully described one specific embodiment of my improved apparatus by which my improved process can be practiced, it is to be distinctly understood that I do not consider my invention, as to my process and my apparatus, to be limited thereby, but refer for its scope to the claims appended hereto.

The drawing filed herewith is a vertical section of my improved apparatus which has the main tank T with overflow launder 1 and sloping bottom 2 in the center of which is the discharge pipe 3 entering the auxiliary tank T—1 disposed below the main tank T. Suitably mounted on the beams 4 over the tank T is the rotatable casing 5 having its open end 6 extended into the tank T. Suitably mounted on the beams 4 there is the motor M with shaft 7 carrying a suitable impeller head (not shown) disposed in the casing 5. Received within the casing 5 and carried thereby is the discharge pipe 8 with the distributor head 9 to which are attached the radial pipes 10 having the downwardly extended tangential nozzles 11 disposed adjacent the bottom 2 of the tank T. A shaft 12 extends downwardly from the head 9 through the pipe 3 into the auxiliary tank T—1 carrying the distributor head 13 to which are attached the radial pipes 14 having the downwardly extended tangential nozzles 15. A supply pipe 16 with valve 17 passes into the tank T—1 and communicates with head 13. A discharge pipe 18 passes out of the upper part of the tank T—1 and communicates with the upper part of the tank T, having a control valve 19. From the sloping bottom 20 of the tank T—1 at its center there is a discharge pipe 21 communicating with the lower end of the casing 22 of the endless-belt conveyer 23 driven by the motor M—1.

I provide a reservoir 24, communicating with the casing 22, in which is disposed the float 25 having the guide rod 26 in the guide keeper 27, and connected by the rod 28 having the adjusting turn-buckle 29 with the lever 30 pivoted at 31 on the reservoir 24 and having the balance 32, and a slot-and-pin connection 33 with the lever 34 operating the valve 35 on the water supply pipe 36 for supplying water to the reservoir 24.

The mixed materials are fed to the main tank T by the Y-shaped supply chute 37 with feed wells 38 extended downwardly into the tank T, their discharge ends 39 being in the same horizontal plane with the end 6 of the casing 5.

Having described the details of construction of my improved apparatus, I will now describe its use and operation in the practice of my improved process. The tanks T and T—1 are supplied with water from pipe 16 and the mixed materials are delivered into the tank T through chute 37 and its feed wells 38. The impeller head on shaft 7, in the casing 5, being actuated by the motor M, induces a flow of water from tank T into the open end 6 of the casing 5 and, therefrom, through the pipe 8, to the head 9 and pipes 10 and out through nozzles 11 back into the tank T. As is well known, the emission of the liquid from these nozzles 11 causes rotation of the head 9, thereby causing rotation therewith of head 13 and its nozzles 15 in tank T—1. The circulation of water through tank T creates an upwardly flowing current causing the hydraulic separation of the mixed materials fed into tank T, the overflow product passing out of the top of tank T through launder 1 and the underflow product passing out of tank T through pipe 3 into the auxiliary tank T—1. By the suitable adjustment of valve 17 in the pipe 16, water is supplied through pipe 16 in regulated amount to head 13 and its nozzles 15, in tank T—1, creating a second upwardly flowing current causing hydraulic separation of the mixed underflow from tank T. This upward current is so controlled as to cause the desired overflow product to be separated out and pass from the tank T—1 through pipe 18 to the upper part of tank T to be re-treated therein. The underflow product of the tank T—1 passes downwardly through pipe 21.

By means of the water supply pipe 36 and float 25 in reservoir 24 communicating with the casing 22, an upwardly flowing current of water can be supplied from casing 22 through pipe 21 to tank T—1. Thus there is provided means for creating a third upwardly flowing current causing hydraulic separation of the mixed underflow product from tank T—1, resulting in the overflow product returning to tank T—1 for re-treatment therein, the underflow product passing to casing 22 to be discharged from the apparatus by the conveyer 23.

Variations in the density of the fluid circulated in tank T, caused by fluctuations in the quantity and quality of the mixed materials being fed into the tank T, result in variations of the flow of the current through pipe 21. If, due to an increase in the quantity of the underflow product in the feed, the density of the fluid is increased, the water level in the reservoir 24 is caused to rise, raising float 25 and thereby reducing the volume of water supplied to the apparatus from pipe 36. This results in a decrease in the velocity of the upward current through pipe 21 into tank T—1, permitting faster discharge of the underflow product of tank T—1. If, however, due to a decrease in the quantity of the underflow product in the feed, the density of the fluid is decreased, the water level in the reservoir 24 fails, lowering the float 25 and thereby causing an increase in the volume of water supplied to the apparatus from pipe 36. This results in an increase in the velocity of the upward current through pipe 21 into tank T—1, causing a retarding of the discharge of the underflow product from tank T—1. It is obvious that this automatic control of the upward current through pipe 21, produces the desired hydraulic separation in pipe 21, the current being increased when the overflow product increases with the decrease of the underflow product, and the current being decreased when the overflow product decreases with the increase of the underflow product. This operation of my apparatus secures the fully automatic control of the density of the fluid in the tanks, thereby producing under all operating conditions that desired degree of specific gravity of the fluid, so that it shall accurately and efficiently product the desired separation of the overflow and underflow products, while providing three stages of hydraulic separation.

Having described my invention, what I claim is:

1. The process of separating mixed materials which consists in subjecting the materials to the classifying effect of an upwardly flowing current of a fluid medium, thereby segregating the overflow and the underflow products, discharging the overflow product; subjecting the underflow product to the classifying effect of an upwardly flowing current of water, thereby segregating the overflow and underflow products; discharging the overflow product, produced by the current of water, downwardly into the current of the fluid medium; supplementing the effect of the upwardly flowing current of water by the classifying effect of a second upwardly flowing current of water, thereby segregating from the last mentioned underflow product any residue of light materials not previously separated, and retaining such light materials in said first mentioned current of water; and discharging the last mentioned underflow product.

2. The process of separating mixed materials which consists in subjecting the materials to the classifying effect of an upwardly flowing current of a fluid medium, thereby segregating the overflow and underflow products, discharging the overflow product; subjecting the underflow product to the classifying effect of an upwardly flowing current of water, thereby segregating the overflow and underflow products; discharging the overflow product, produced by the current of water, downwardly into the current of the fluid medium; supplementing the effect of the upwardly flowing current of water by the classifying effect of a second upwardly flowing current of water, thereby segregating from the last mentioned underflow product any residue of light materials not previously separated, and retaining such light materials in said first mentioned current of water, discharging the last mentioned underflow product; and varying the flow rate of said second current of water in accordance with the fluctuations in the density of the fluid medium.

3. The process of separating mixed materials which consists in creating three currents of water, one caused by circulating a given volume of water, one caused by a regulated constant supply of water, and one caused by a variable supply of water; subjecting the mixed materials to the effect of said circulated current, thereby segregating the overflow and underflow products subjecting the underflow products to the effect of the constant supply current, thereby segregating the overflow and underflow products; supplementing the effect of the constant supply current by the classifying effect of the variable supply current, thereby segregating from the last mentioned underflow product any residue of light materials not previously separated, and retaining such materials in said constant supply current; and discharging the last mentioned underflow product.

4. The process of separating mixed materials which consists in creating three currents of water, one caused by circulating a given volume of water, one caused by a regulated constant supply of water, and one caused by a variable supply of water; subjecting the mixed materials to the effect of said circulated current, producing a fluid medium of variable density, thereby segregating the overflow and underflow products; subjecting the underflow products to the effect of the constant supply current, thereby segregating the overflow and underflow products; supplementing the effect of the constant supply current by the classifying effect of the variable supply current, thereby segregating from the last mentioned underflow product any residue of light materials not previously separated, and retaining such materials in said constant supply current; discharging the last mentioned underflow product; and varying the supply in accordance with the fluctuations of the density of the fluid medium.

5. In an apparatus for separating mixed materials, the combination of a tank; an underflow discharge conduit for said tank; a second tank into which said conduit discharges; an underflow discharge conduit for said second tank; means in said first tank adapted to cause a current of water to circulate within said first tank, to cause hydraulic separation of materials in said first tank; means adapted to introduce a current of water into said second tank, to cause hydraulic separation of materials in said second tank; means adapted to convey said current of water around the discharge conduit of said first tank and cause said current to flow into the upper portion of said first tank; means adapted to introduce a second current of water into said second tank through its discharge conduit, to supplement said hydraulic separation of materials in said second tank.

6. In an apparatus for separating mixed materials, the combination of a tank; an underflow discharge conduit for said tank; a second tank into which said conduit discharges; an underflow discharge conduit for said second tank; means in said first tank adapted to cause a current of water to circulate within said first tank, to cause hydraulic separation of materials and produce a fluid medium of variable density in said first tank; means adapted to introduce a current of water into said second tank, to cause hydraulic separation of materials in said second tank; means adapted to convey said current of water around the discharge conduit of said first tank and cause said current to flow into the upper portion of said first tank; means adapted to introduce a second current of water into said second tank through its discharge conduit, to supplement said hydraulic separation of materials in said second tank; and means adapted to vary the volume of water supplied to said conduit, said varying means being controlled by the variations in the density of said fluid medium.

WALTER L. REMICK.